United States Patent
Hua et al.

(10) Patent No.: US 8,706,740 B2
(45) Date of Patent: Apr. 22, 2014

(54) CONCEPT-STRUCTURED IMAGE SEARCH

(71) Applicant: Microsoft Corporation, Redmond, WA (US)

(72) Inventors: Xian-Sheng Hua, Beijing (CN); Jingdong Wang, Beijing (CN); Hao Xu, Guangzhou (CN)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 13/760,680

(22) Filed: Feb. 6, 2013

(65) Prior Publication Data

US 2013/0151510 A1  Jun. 13, 2013

Related U.S. Application Data

(62) Division of application No. 12/565,313, filed on Sep. 23, 2009, now Pat. No. 8,392,430.

(51) Int. Cl.
*G06F 17/30* (2006.01)

(52) U.S. Cl.
USPC .......................... 707/748; 707/754; 707/769

(58) Field of Classification Search
USPC ........................................ 707/748, 754, 769
See application file for complete search history.

(56) References Cited

U.S. PATENT DOCUMENTS

| | | | |
|---|---|---|---|
| 5,796,991 A | 8/1998 | Shimizu | |
| 6,526,400 B1 | 2/2003 | Takata et al. | |
| 6,856,987 B2 | 2/2005 | Kobayashi et al. | |
| 7,099,860 B1 | 8/2006 | Liu et al. | |
| 2002/0175932 A1 | 11/2002 | Yu et al. | |
| 2003/0123735 A1* | 7/2003 | Kasutani | 382/190 |
| 2003/0195883 A1 | 10/2003 | Mojsilovic et al. | |
| 2004/0267740 A1* | 12/2004 | Liu et al. | 707/3 |
| 2005/0038775 A1 | 2/2005 | Haveliwala et al. | |
| 2006/0277167 A1* | 12/2006 | Gross et al. | 707/3 |
| 2007/0223811 A1* | 9/2007 | Kudo et al. | 382/162 |
| 2007/0276801 A1 | 11/2007 | Lawrence et al. | |
| 2008/0065606 A1 | 3/2008 | Boys et al. | |
| 2010/0262616 A1* | 10/2010 | Eskolin et al. | 707/769 |

OTHER PUBLICATIONS

Cheng, E., F. Jing, M. Li, W.-Y.Ma, H. Jin, Using implicit relevane feedback to advance web image search, Proc. of the 2006 IEEE Int'l Conf. on Multimedia and Expo, ICME 2006, Jul. 9-12, 2006, pp. 1773-1776, Toronto, Ontario, Canada.

(Continued)

*Primary Examiner* — Pierre Vital
*Assistant Examiner* — Andalib Lodhi
(74) *Attorney, Agent, or Firm* — Carole Boelitz; Micky Minhas (57) ABSTRACT

The concept-structured image search technique described herein pertains to a technique for enabling a user to indicate their semantic intention and then retrieve and rank images from a database or other image set according to this intention. The concept-structured image search technique described herein includes a new interface for image search. With this interface, a user can freely type several key textual words in arbitrary positions on a blank image, and also describe a region for each keyword that indicates its influence scope, which is called concept structure herein. The concept-structured image search technique will return and rank images that are in accordance with the concept structure indicated by the user. One embodiment of the technique can be used to create a synthesized image without actually using the synthesized image to perform a search of an image set.

18 Claims, 8 Drawing Sheets

(56) References Cited

OTHER PUBLICATIONS

Cui, J., F. Wen, X. Tang, IntentSearch: Interactive on-line image search re-ranking, Proc. of the 16th Int'l Conf. on Multimedia 2008, ACM Multimedia 2008, Oct. 26-31, 2008, pp. 997-998, Vancouver, British Columbia, Canada.

Cui, J., F. Wen, X. Tang, Real time Google and live image search re-ranking, Proc. of the 16th Int'l Conf. on Multimedia 2008, ACM Multimedia 2008, Oct. 26-31, 2008, pp. 729-732, Vancouver, British Columbia, Canada.

Datta, R., D. Joshi, J. Li, J. Z. Wang, Image retrieval: Ideas, influences, and trends of the new age, ACM Comput. Surv., Apr. 2008, pp. 5:1-5:60, vol. 40, No. 2.

Hu, Y., N. Yu, Z. Li, M. Li, Image search result clustering and re-ranking via partial grouping, Int'l Conf. on Multimedia and Expo, Jul. 2007, pp. 603-606.

Jia, Y., J. Wang, C. Zhang, X.-S. Hua, Finding image exemplars using fast sparse affinity propagation, Proc. of the 16th Int'l Conf. on Multimedia 2008, ACM Multimedia 2008, Oct. 26-31, 2008, pp. 639-642, Vancouver, British Columbia, Canada.

Levin, A., A. Zomet, S. Peleg, Y. Weiss, Seamless image stitching in the gradient domain, Proc. 8th European Conf. on Comp. Vision, May 11-14, 2004, pp. 377-389, Prague, Czech Republic.

Liu, H., X. Xie, X. Tang, Z. Li, W.-Y. Ma, Effective browsing of web image search results, Proc. of the 6th ACM SIGMM Int'l Workshop on Multimedia Info. Retrieval, MIR 2004, Oct. 15-16, 2004, pp. 84-90, New York, NY, USA.

Wang, J., Y. Jia, X.-S. Hua, C. Zhang, L. Quan, Normalized tree partitioning for image segmentation, 2008 IEEE Comp. Society Conf. on Comp. Vision and Pattern Recognition, CVPR 2008, Jun. 24-26, 2008, Anchorage, Alaska, USA.

Yahoo Search Blog, Explore points of interest with Yahoo! Image Search, Jul. 24, 2009, pp. 7.

Lodhi, Andalib Ft, U.S. Office Action, U.S. Appl. No. 12/565,313, Feb. 24, 2012, pp. 1-15.

Lodhi, Andalib Ft, U.S. Notice of Allowance, U.S. Appl. No. 12/565,313, Oct. 18, 2012, pp. 1-10.

\* cited by examiner

CONCEPT-STRUCTURED IMAGE SEARCH

This is a division of prior application Ser. No. 12/565,313 entitled "Concept-Structured Image Search" and filed Sep. 23, 2009.

BACKGROUND

The rapid development of commercial image search engines has allowed users to easily retrieve a large number of images simply by typing in a text query into a search engine. Existing search engines, however, only use the relevance of text information associated with images in ranking image search results. Existing search engines typically do not use the visual information associated with images in providing search results.

The growth of digital image content has made it more of a challenge to browse through a large number of search results. Two techniques commonly employed to assist with search result refinement are content-based re-ranking and a technique called IntentSearch. Content-based re-ranking relies on image clustering and categorization to provide a high-level description of a set of images. While content-based re-ranking uses visual information to reorder the search results, it does not take into consideration the intent of the user. On the other hand, IntentSearch provides an interface to allow users to indicate a few images of interest, and automatically attempts to guess the intent of the user to reorder image search results. However, guessing the intent of the user is somewhat difficult based on selected images. Recently, a color structured image search was proposed to enable the user to indicate their intent by simply drawing a few color strokes on a blank image that reflects the color spatial distribution that the user is looking for in an image. With this technique, it is not easy for a user to indicate their semantic intent or the spatial distribution of the content they are seeking in an image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A new technique to enable a user to indicate their semantic intention and then rank images according to this intention, herein called concept-structured image search, is described. The concept-structured image search technique described herein includes a new interface for image search. With this interface, the user can freely type several key textual words in arbitrary positions on a blank image, and also describe a region for each keyword that indicates its influence scope, which is called a concept structure herein.

The concept-structured image search technique will return images that are in accordance with the concept structure indicated by the user. In one embodiment of the technique, after the user specifies the concept structure, the technique automatically searches for images in an image set such as a database corresponding to those keywords using a search engine. The technique selects images from the search results for each keyword, according to the concept structure, and synthesizes one or more novel images that are consistent with the concept structure specified by the user by placing the selected images in the position set by the user and stitching the images together in a seamless way. In one embodiment of the concept-structured image search technique optional operations can be performed by the user to ensure a synthesized image is in accordance with a user's intent. Feature extraction is performed on each synthesized image and the extracted features are used to compare the synthesized image with the images in the image set or other database to get similarity scores. Finally, the similarity scores are used to rank the images in the image set.

One embodiment of the technique can be used to create a synthesized image without actually using the synthesized image to perform the search.

DESCRIPTION OF THE DRAWINGS

The specific features, aspects, and advantages of the disclosure will become better understood with regard to the following description, appended claims, and accompanying drawings where:

FIGS. 5A through 5D provide an illustration of an exemplary user interface for entering a concept-structured query in accordance with the concept-structured image search technique.

DETAILED DESCRIPTION

In the following description of the concept-structured image search technique, reference is made to the accompanying drawings, which form a part thereof, and which show by way of illustration examples by which the concept-structured image search technique described herein may be practiced. It is to be understood that other embodiments may be utilized and structural changes may be made without departing from the scope of the claimed subject matter.

1.0 Concept-Structured Image Search Technique.

The following sections provide an overview of the concept-structured image search technique, as well as exemplary processes for employing the technique. An exemplary architecture for employing the technique and details of the technique are also provided.

1.1 Overview of the Technique

Figure 1:
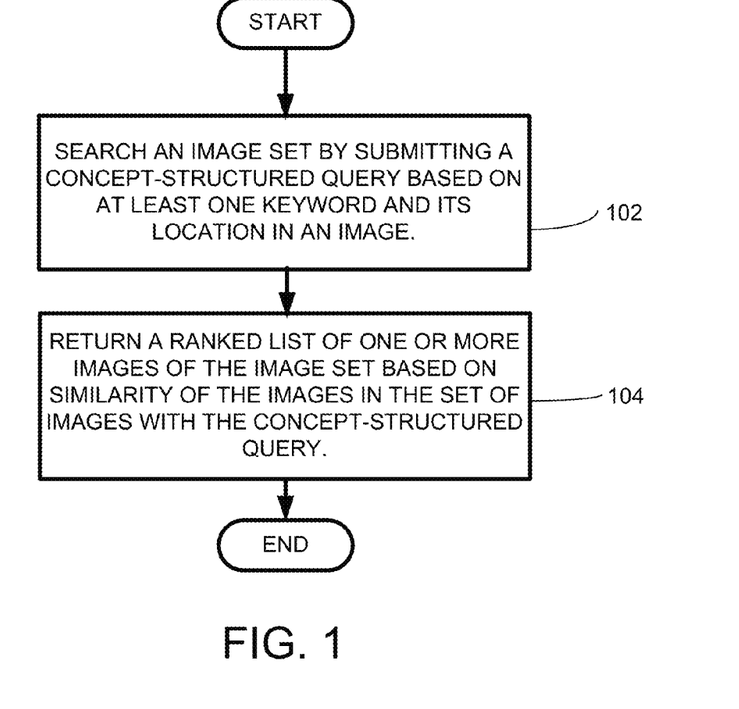
FIG. 1 depicts a high level overview of an exemplary embodiment of the concept-structured image search technique described herein that ranks images in an image set or refines image search results.

FIG. 1 provides a high level overview flow diagram of one embodiment of the concept-structured image search technique. As shown in FIG. 1, an image database or a set of images is searched by submitting a concept-structured query based on at least one keyword and its location in an image (block 102). The technique then returns a ranked list of one or more images of the set of images based on similarity of the images with the concept-structured query, as shown in block 104.

1.2 Exemplary Processes Employed by the Concept-Structured Image Search Technique.

Figure 2:
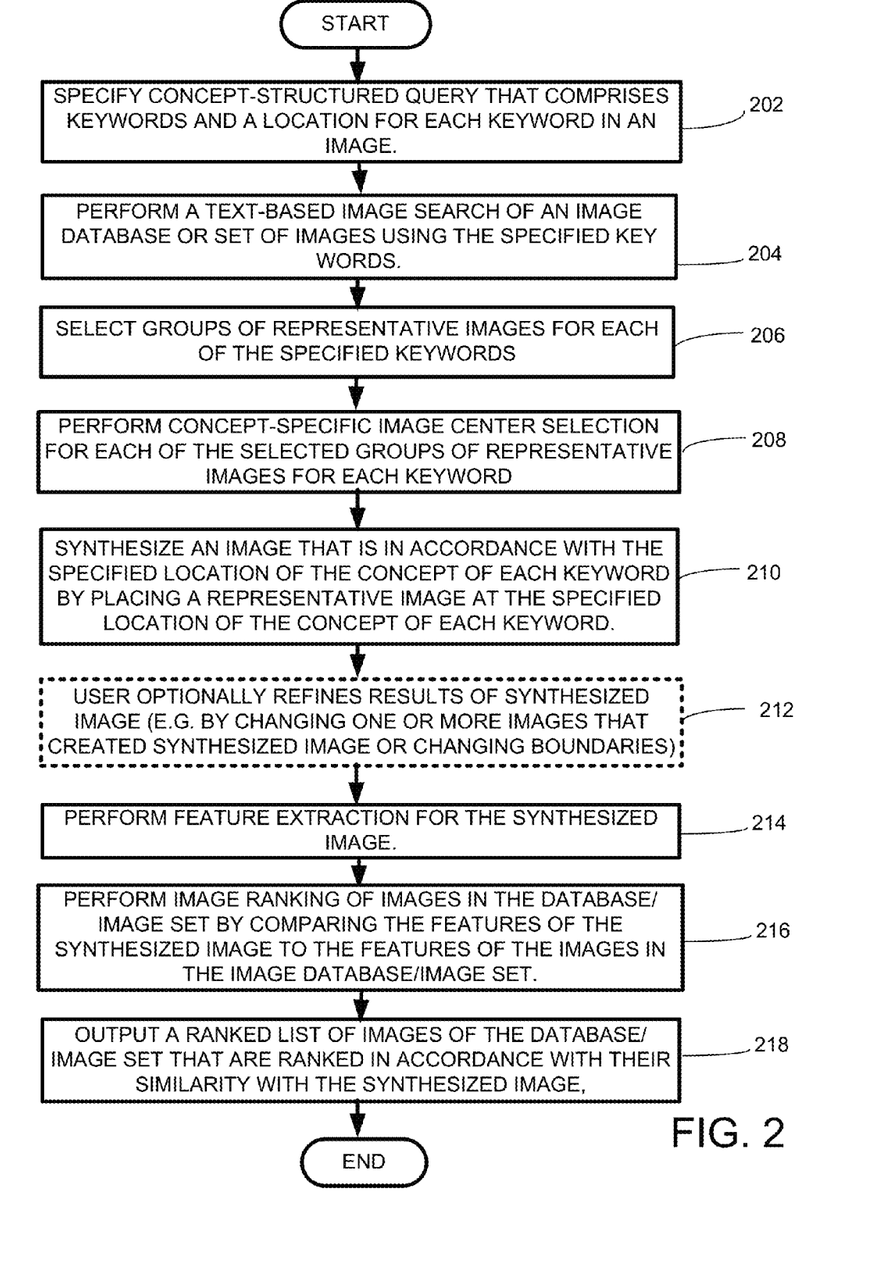
FIG. 2 is a flow diagram depicting an exemplary embodiment of a process for employing the concept-structured image search technique described herein that ranks images in an image set or refines image search results.

FIG. 2 provides a more detailed flow diagram of one exemplary process 200 for employing the concept-structured image search technique described herein. In this embodiment a convenient user interface is presented to allow the user to indicate their intent. In this interface, the user places keywords of interest in some position on a blank image, for example an image displayed in a window on the display of a computing device, and manipulates an ellipse for each keyword to indicate the influence scope of that keyword. Details of this user interface will be provided later. In this embodiment, as shown in block 202, a user specifies a concept-structured query that employs keywords and a location for each keyword in an image. Next, according to the concept structure, the technique performs a text-based image search (for example, by searching the annotation or metadata associated with the images) and obtains image search results for each keyword, as shown in block 204. The technique selects groups of representative images for each of the specified keywords, as shown in block 206, and performs concept-specific image center selection for each of the selected groups of representative images for each keyword in order to identify the representative center image for each group, as shown in block 208. The technique then synthesizes one or more novel images that are consistent with the concept structure specified by the user by placing representative images in the position specified by the user and stitching them together in a seamless way (block 210). Two optional operations can be performed at this point, as shown in block 212. The first is that the user can manually select images from the search results to replace the original representative image in the synthesized image. The second is that the user can drag a representative image in the synthesized image to a user-expected position and then re-stitch the representative images again to create a new synthesized image. These two optional operations employ the user's assistance. Once the synthesized image is satisfactory to the user, the concept-structured image search technique automatically extracts features for the synthesized image (block 214) and automatically compares the synthesized image with the images in the image database or image set to be ranked (e.g., previous search results in the case of search result refinement or other image set) using the synthesized image. Images in the data base or image set will then be ranked based on their similarity with the synthesized image based on feature matching, block 216. For example, the features of the images of a database can be extracted before the search takes place and the features extracted from the synthesized image can be compared to the features of the images of the database or image set to be ranked to assess similarity. A ranked list of images is then output, ranked in accordance with their similarity to the synthesized image and thus their similarity with the concept-structured layout specified by the user. It should be noted that a synthesized image can be used to search any database or image set, not just the one searched in the original text-based search.

Figure 3:
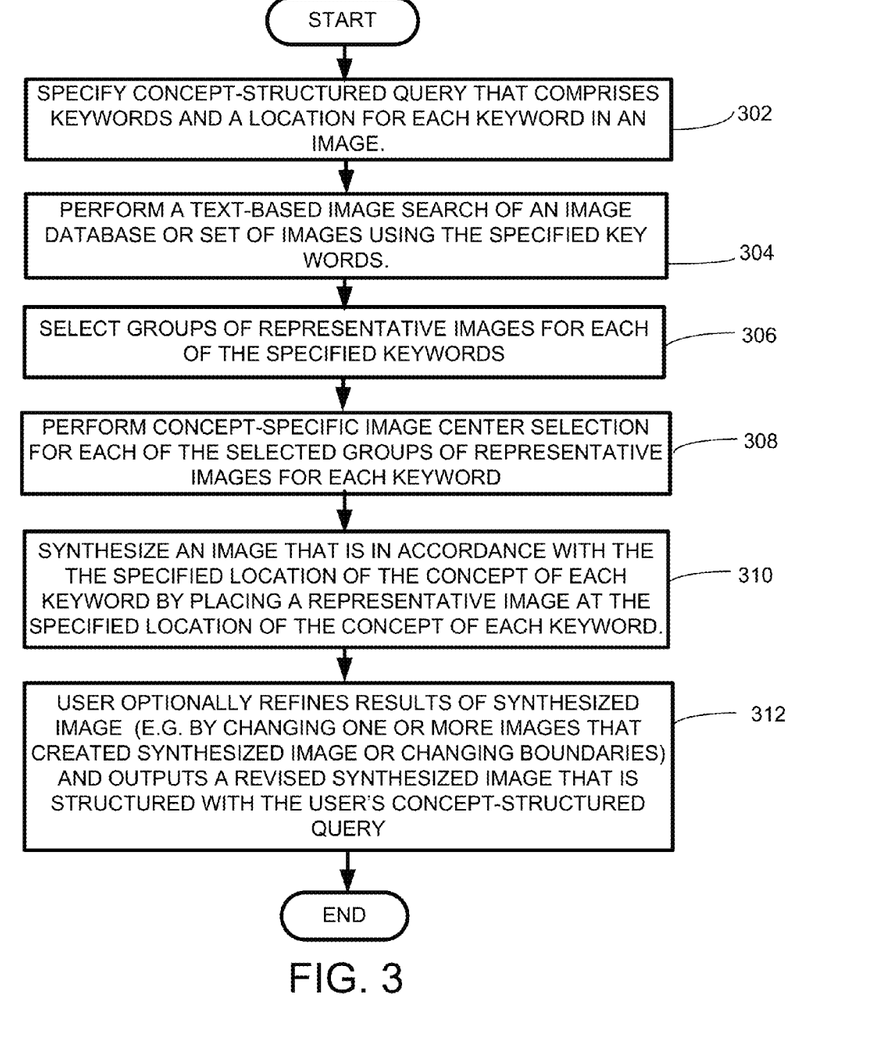
FIG. 3 is a flow diagram depicting an exemplary embodiment of a process for employing the concept-structured image search technique wherein a synthesized image is created.

Another exemplary process 300 for employing the concept-structured image search technique described herein is shown in FIG. 3. In this embodiment the synthesized image is the product of the technique and the synthesized image is not further used to perform a search of a database or other image set. In this embodiment, as shown in block 302, a user specifies a concept-structured query that employs keywords and a location for each keyword in an image, as well as the scope of influence for the keyword. Next, according to the concept structure, the technique performs a text-based image search (for example, by searching the annotation or metadata associated with the images) and selects images from the search results for each keyword, as shown in block 304. The technique selects groups of representative images for each of the specified keywords, as shown in block 306 and performs concept-specific image center selection for each of the selected groups of representative images for each keyword to find a good representative image for the group to be stitched into the synthesized image, as shown in block 308. The technique then synthesizes one or more novel images that are consistent with the concept structure specified by the user by placing images in the position specified by the user and stitching them together in a seamless way (block 310). The user can then perform the optional operations as discussed above to improve the synthesized image, as shown in block 312. The user can, by manually select images to replace the original image in the synthesized image or drag an image in the synthesized image to a user-expected position and then re-stitch the images again to create a revised synthesized image. The output is a satisfactorily synthesized image that is structured in accordance with the user's concept-structured query.

1.3 Exemplary Architecture Employing the Concept-Structured Image Search Technique.

Figure 4:
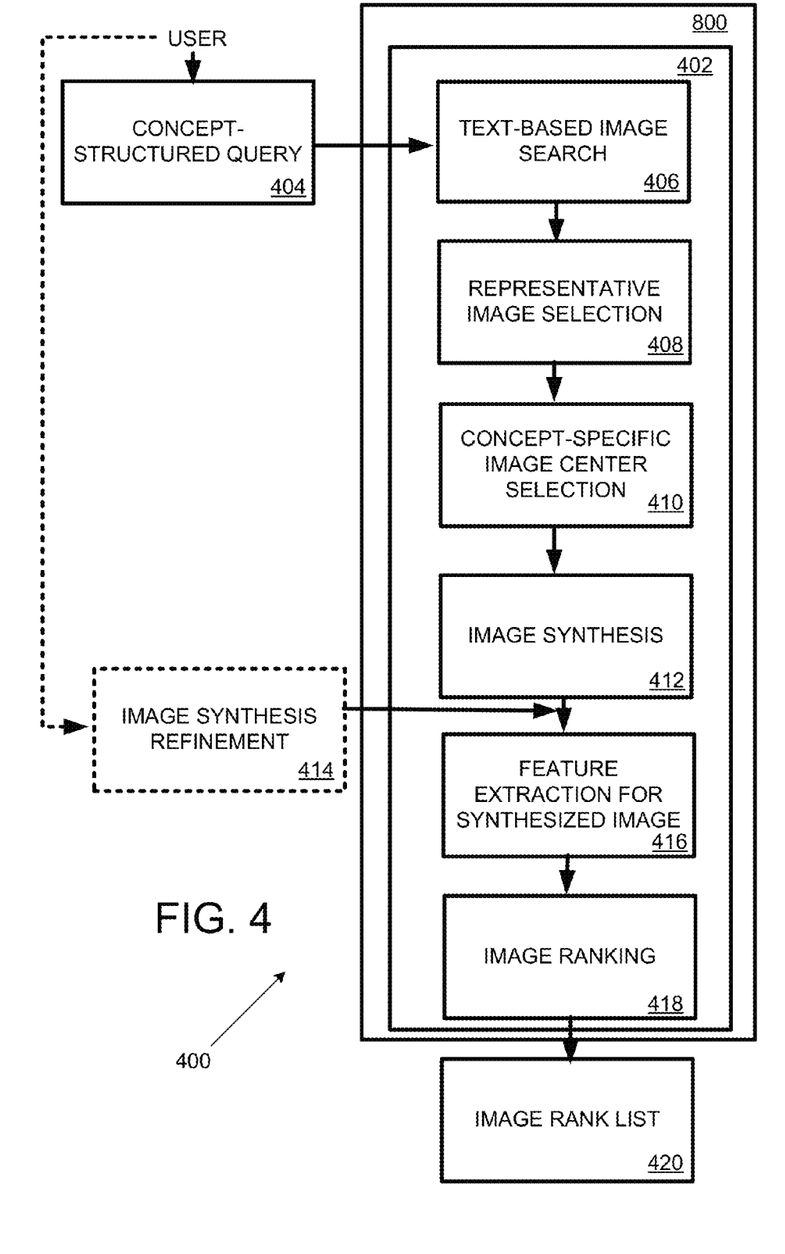
FIG. 4 depicts an exemplary system architecture in which one embodiment of the concept-structured image search technique can be practiced.
Figure 5A:
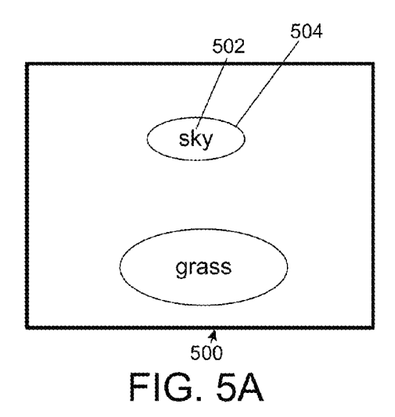
FIG. 5A shows a user input query comprised of "sky" and "grass", as well as corresponding ellipses indicating the scope of influence of those keywords.
Figure 5B:
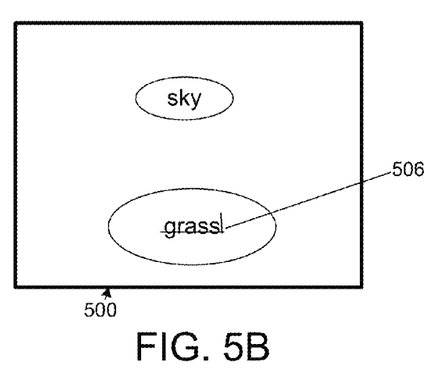
FIG. 5B shows keyword editing in accordance with one embodiment the concept-structured image search technique.
Figure 5C:
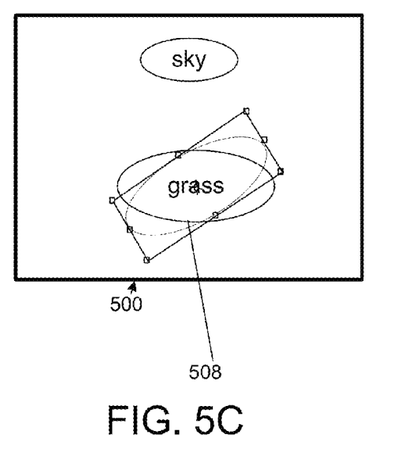
FIG. 5C shows rotation operations for rotating an ellipse in accordance with one embodiment of the concept-structured image search technique.
Figure 5D:
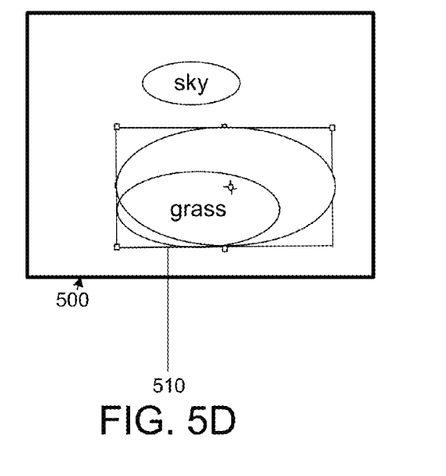
FIG. 5D shows scaling operations for scaling an ellipse in accordance with one embodiment of the concept-structured image search technique.

FIG. 4 provides one exemplary architecture 400 in which one embodiment of the concept-structured image search technique can be practiced in order to create a synthesized image or to rank or re-rank images returned in a search.

As shown in FIG. 4, the exemplary architecture 400 employs a concept-structured image search module 402, which typically resides on a general computing device 800 such as will be discussed in greater detail with respect to FIG. 8. A concept-structured query 404 is input into the concept-structured image search module 402. The concept-structured query module 402 employs a text-based image search module 406 that searches a database or other image set to return a set of images for each keyword entered in the query. A representative image selection module 408 then selects representative images for each keyword. A concept-specific center image is selected for each keyword using a concept-specific image center selection module 410. The architecture 400 then synthesizes one or more novel images that are consistent with the concept structure specified by the user by placing images representative of each group in the position specified by the user and stitching them together in a seamless way using an image synthesis module 412. Then, two optional steps can be performed using input from the user and an image refinement module 414, as previously discussed. Features are then extracted from the satisfactorily synthesized image in a feature extraction module 416 and the extracted features are used to rank the images returned in the text-based search or a different image set in an image ranking module 418. The output is a ranked list of images 420 that are ranked by how similar they are to the concept-specific search query.

1.4 Application Scenarios

The concept-structured image search technique described herein can be applied to various kinds of applications. One application is general image retrieval where the images that are ranked are from an image collection, which may be obtained by crawling the Internet or collected from a personal photo album. Another application is image search result refinement. In image search result refinement ranked images are from the image search results returned from a search engine. The concept-structured image search technique is used to re-rank the retrieved images based on the concept specified by the user. Additionally, the concept-structured image search technique can be used to only synthesize an image without using it for a database search or search refinement. For example, if the user wanted an image of a specific combination of objects, but could not find one, he or she could synthesize such an image using the technique.

1.5 Details of the Concept-Structured Image Search Technique

The following paragraphs provide details of various embodiments of the concept-structured image search technique.

1.5.1 Concept-Structured Query Specification.

In one embodiment of the technique, the user is provided with a blank image (e.g., displayed on the display of a computing device), on which the user is expected to type keywords (e.g., sky, grass, people) in arbitrary positions and draw an ellipse around each keyword. The ellipse indicates the influence scope of the keyword. For the user's convenience, the technique supports the operations including keyword editing and ellipses editing. More specifically, by ellipse editing, free transforms (e.g., rotation, scaling, translating) are allowed. The user can also treat a keyword and associated ellipse as a unit, and move or delete it as well. This structured query is called a concept-structured query. A user interface that is designed to support the concept-structured query is very flexible and presents several operations, such as, for example, move, copy and paste, remove, reshape and so on.

1.5.2 Text Based Image Search

In one embodiment of the concept-structured image search technique, each keyword entered by the user is then used to query a set of images via an image search engine. The search results corresponding to the query consist of several image collections, each corresponding to a keyword.

1.5.3 Representative Image Selection

Representative image selection aims at grouping the images and selecting one representative image from each of these groups for each image collection, i.e., for the images corresponding to each keyword. In one embodiment, there are five groups for each keyword, although other numbers of groups could be used for any given keyword. For each image collection, the representative images for each group are found by finding exemplars that best represent the keyword from the group of search results/database/image set to be ranked. In one embodiment a technique for finding image exemplars using fast sparse affinity propagation is employed, although any other suitable method of finding representative images for each keyword could be used. The fast sparse affinity propagation method of finding the representative images uses affinity propagation and a fast sparse affinity algorithm to group images into several clusters and assign an exemplar image for each of these clusters at the same time. In one embodiment, the exemplar images of the five largest clusters are selected as representative images for the keyword, among which, the exemplar image of the largest cluster is used in image synthesis while the other exemplar images are listed for user to select in the "image synthesis refinement".

1.5.4 Concept-Specific Image Center Selection

Concept-specific image selection employs a type of common pattern discovery and aims to find the semantic center of each image according to the corresponding keyword. The technique calculates the centers of the images group by group (i.e., the five groups obtained in above representative image selection in one embodiment of the technique). In one embodiment, the procedure for one group is as follows. First, each image is segmented into a set of sub-regions. In one embodiment this is done using normalized tree partitioning for image segmentation. The images in the same group should share some similar sub-regions that are semantically related to user's keyword. Therefore, the technique performs a filtering procedure as following. For each group of images, the technique segments each image into sub-regions, and performs clustering for the sub-regions in the group through KMeans algorithm. From the resulting clusters, the technique picks out the five largest ones and abandons all sub-regions in other clusters. For each image, the technique forms a binary map such that the binary value is set as 1 if the corresponding sub-region belongs to the top 5 largest clusters and 0 otherwise. Then the technique finds the largest connected region for each image in the group, by only considering the regions in the binary map whose value is 1. Finally, the technique calculates the center of the largest connected region of an image as its semantic center.

1.5.5 Image Synthesis

Figure 6:
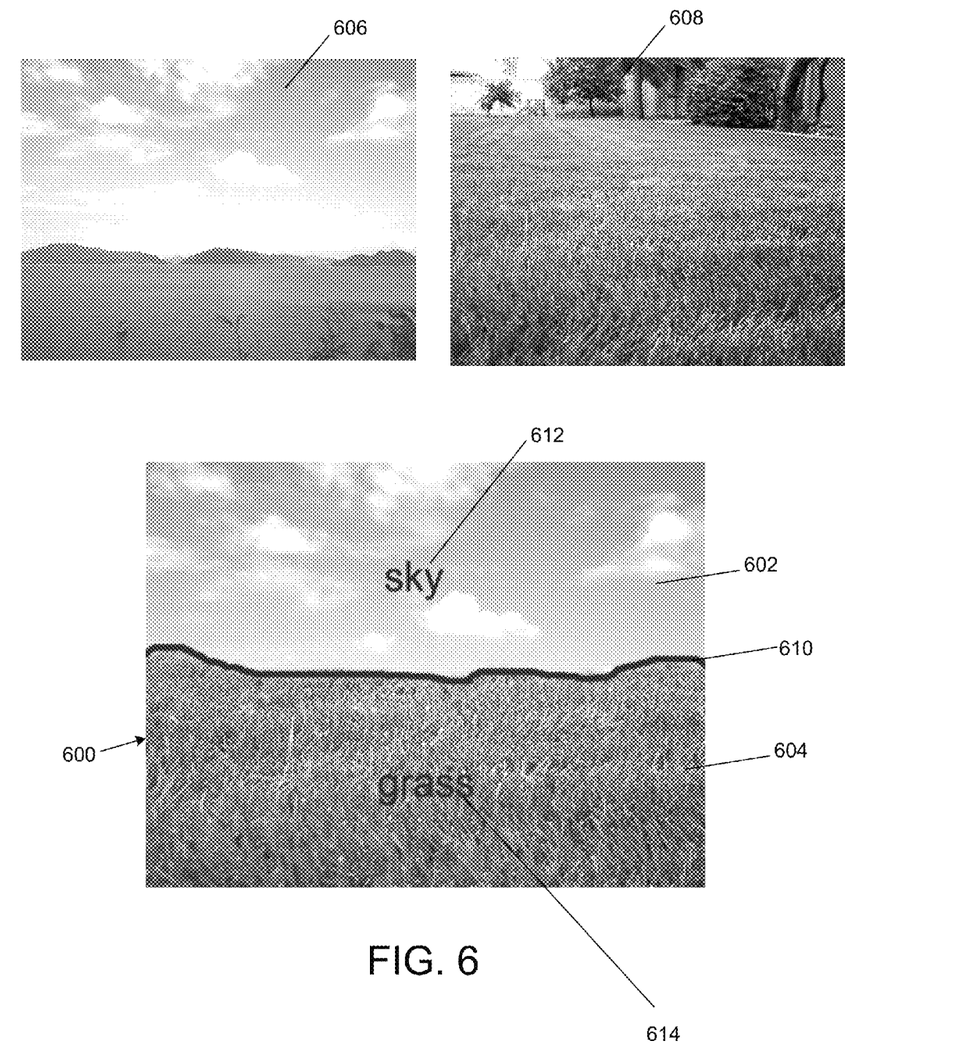
FIG. 6 provides an illustration of synthesized image generation corresponding to a concept-structured query. The upper left and right images are the representative images for keyword "sky" and "grass" respectively. The bottom image is the synthesized image using the upper left and right images.

The image synthesis operation of the concept-structured image search technique aims to synthesize images that are in accordance with the concept structure specified by the user. In one embodiment, the technique synthesizes at least one image by selecting one representative image for each query term or keyword as discussed above. After that, image synthesis using the representative images for the keywords is performed as follows. First, a representative image for each keyword or query term is placed in the image to be synthesized by aligning its center (selected as discussed above) with the position of the keyword (i.e., the center of the corresponding ellipse) which was specified in the concept-structured query by the query. To handle overlapping regions between the representative images from different keywords, various conventional stitching techniques can be employed. One embodiment of the technique employs an image stitching technique that defines and optimizes cost functions for the evaluation of the quality of image stitching. In these cost functions, the similarity to the input images and the visibility of the stitching seam are defined in the gradient domain, minimizing disturbing edges along a seam. An example of synthesized image 600 is depicted in FIG. 6 where sub-regions 602, 604 from different representative images 606, 608 are separated by a black contour 610 and associated keywords 612, 614 are depicted as well. It should also be noted that the image synthesis process can be repeated several times to generate a set of synthesized images for a search query. In one exemplary embodiment of the concept-structured image search technique, five synthesized images are created in order to let the user select which of the synthesized images best represent the user's concept.

Figure 7:
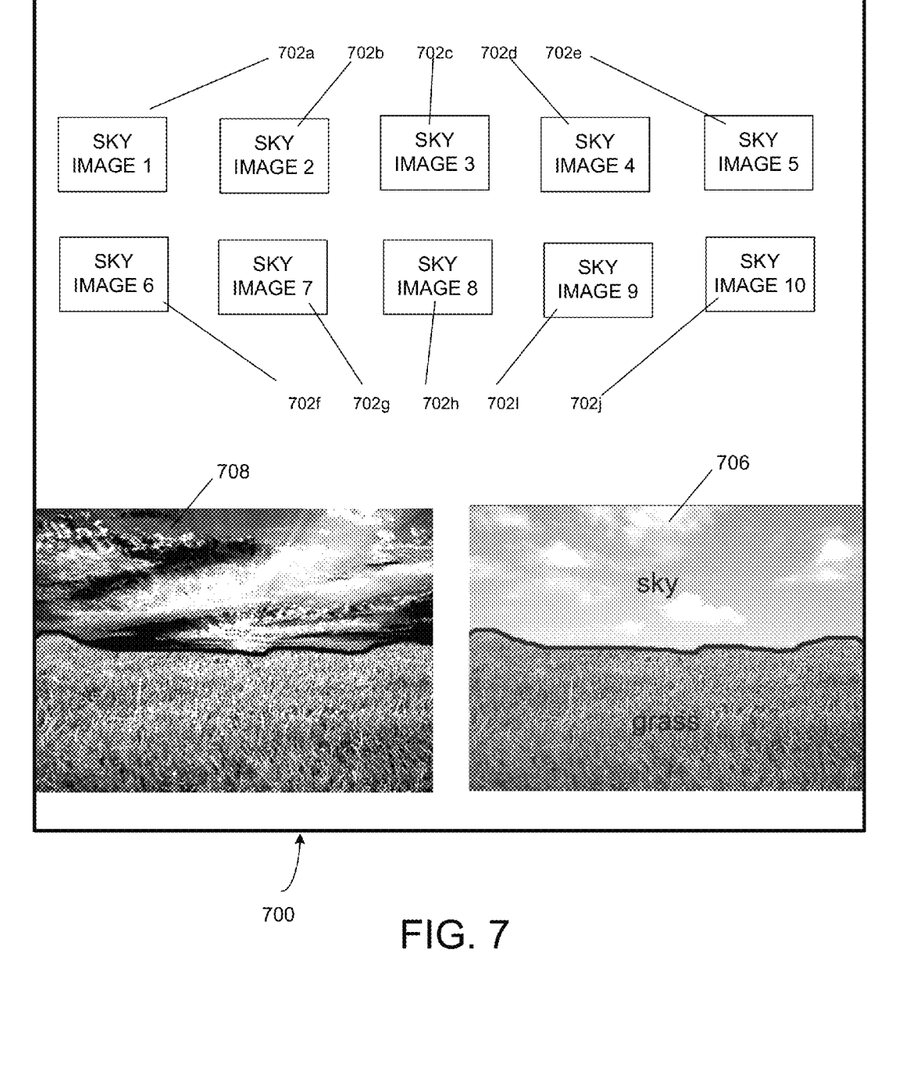
FIG. 7 provides an illustration of an optional user refinement process for the synthesized image shown in FIG. 6. It shows the user selecting another representative image for the keyword "sky" to create a newly synthesized image which is depicted on the left.

After obtaining a synthesized image (or a set of synthesized images), the technique provides an interface 700 (shown in FIG. 7) to allow the user to inspect if the image is similar to what he/she wants. The user is able to check the correctness of sub-regions and consistency of the synthesized image in a glimpse. If the results are not satisfactory, the user can perform two optional operations. These operations correspond to the "Image synthesis refinement" block 414 in FIG. 4. For example, if the user is not satisfied with an automatically selected representative image or images used to create the synthesized image, he or she can replace them with one or more other images 702*a*, 702*b*, 702*c*, 702*d*, 702*e*, 702*f*, 702*g*, 702*h*, 702*i* and 702*j* from the search results through simple mouse dragging of the desired image to the synthesized image 706. Alternately, if the user agrees that the representative image or images represent their concept, but is dissatisfied with the alignment of images that were used to create the synthesized image 706, he or she can drag and move the representative images directly in the synthesized image, so that they can be better stitched. Examples of these refinement operations are illustrated in FIG. 7. FIG. 7 provides an illustration of an optional user interface for the synthesized image shown in FIG. 6. It shows the user selecting another representative image for the keyword "sky" in the original synthesized image 706 and the newly synthesized image 708 is depicted on the left.

1.5.6 Image Feature Extraction

Once an acceptable (e.g., to the user) synthesized image has been generated the feature extraction is performed and these features are used to compare the synthesized image to a set of images to be ranked to determine how similar they are. In one embodiment of the concept-structured image search technique, the features used are block based features, including color moment and color layout features. Specifically, in one embodiment, the technique divides each of the synthesized image and the images of the image set to be ranked into 8*8 pixel blocks. For the images in the database or in an image set to be ranked, in one embodiment, this step is performed offline. For example, in the second application scenario, the feature extraction process is performed after the images are crawled and extracted from the Internet. The features are used to obtain similarity scores between the synthesized images and the images of the image set to be ranked.

1.5.7 Image Ranking

Each of the images to be ranked is assigned a similarity score, which in one embodiment is calculated as the weighted Euclidean Distance between the features of a target (e.g., database/image set to be ranked) image and the synthesized image. The weight for each block is calculated, according to the positions and shapes of the ellipses specified in the concept-structured query. More specifically, the ellipse for each query represents a 2D Gaussian distribution, whose mean and variance are specified by the center and the length of axis of the ellipse respectively. Then for each pixel in the synthesized image, the technique can get a probability using the Gaussian distribution which is selected by checking which keyword the pixel color is from since each pixel in the synthesized image comes from one of the images in which each corresponds one keyword. Then the weight in the block is an aggregation of the probabilities of the pixels in the block. Finally, the images in an image database are ranked according to their similarity score. The list of images, ranked according to their similarity with the synthesized image (and thus the concept-structured query and the intent of the user) can then be output and used for various purposes and applications.

2.0 The Computing Environment

The concept-structured image search technique is designed to operate in a computing environment. The following description is intended to provide a brief, general description of a suitable computing environment in which the concept-structured image search technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 8:
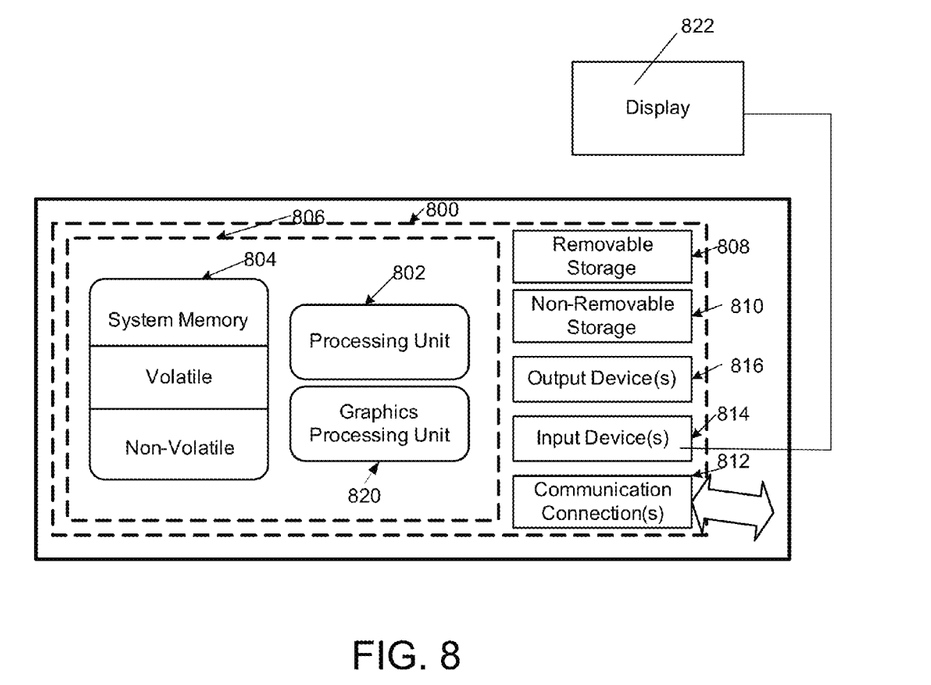
FIG. 8 is a schematic of an exemplary computing device which can be used to practice the concept-structured image search technique.

FIG. 8 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 8, an exemplary system for implementing the concept-structured image search technique includes a computing device, such as computing device 800. In its most basic configuration, computing device 800 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 8 by removable storage 808 and non-removable storage 180. Computer storage media includes volatile and nonvolatile, removable and non-removable media implemented in any method or technology for storage of information such as computer readable instructions, data structures, program modules or other data. Memory 804, removable storage 808 and non-removable storage 180 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 800. Any such computer storage media may be part of device 800.

Device 800 also can contain communications connection(s) 812 that allow the device to communicate with other devices and networks. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 800 has a display device 822 and may have various input device(s) 814 such as a keyboard, mouse, pen, camera, touch input device, and so on. Output device(s) 816 devices such as a display, speakers, a printer, and so on may also be included. All of these devices are well known in the art and need not be discussed at length here.

The concept-structured image search technique may be described in the general context of computer-executable instructions, such as program modules, being executed by a computing device. Generally, program modules include routines, programs, objects, components, data structures, and so on, that perform particular tasks or implement particular abstract data types. The concept-structured image search technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. In a computer system comprising a display and a user interface data entry device, a process for finding an image in a set of images, comprising:
    displaying on the display a window for entering a concept-structured query comprising a concept-structured layout of an image to be found in the set of images;
    receiving a concept-structured query via the window for entering the concept-structured layout by placing at least one keyword representative of an image concept in at least one location in the window using the user interface data entry device;
    creating a synthesized image by placing, for each keyword having a specified location in the window, an image representative of the concept of the keyword at the specified location of each keyword in the window;
    searching the images of the image set using the synthesized image; and
    outputting on the display a ranked list of images of the set of images based on similarity of the images with the synthesized image concept structured layout.

2. The process system-of claim 1 wherein a user inputs the concept structured query by typing at least one keyword in the window for entering the concept-structured layout at a location where an image representative of the concept of the keyword is sought.

3. The process of claim 2 further comprising associating ellipses with each of the keywords to specify the scope and location of the concept associated with the keyword in an image.

4. The process of claim 3 wherein the user can edit the direction and size of the ellipses to alter the scope and location of the concept associated with the keyword in an image.

5. The process of claim 1, further comprising using the synthesized image to find an image similar to the concept-structured layout in a new set of images.

6. A method for finding an image in a set of images, comprising:
    displaying on a display a window for entering a concept-structured query comprising a concept structured layout of an image to be found in the set of images;
    receiving a concept-structured query via the window for entering the concept-structured layout by placing an image concept in at least one location in the window using a user interface data entry device;
    finding images in the images set representative of each of the concepts in the user-entered concept-structured layout;
    creating a synthesized image by placing, for each image concept having a specified location in the window, an image representative of the image concept at the specified location in the window;
    searching the images of the image set using the synthesized image; and
    outputting on the display a ranked list of images of the set of images based on similarity of the images with the synthesized image obtained from concept-structured layout.

7. The method of claim 6 wherein a user inputs the concept-structured query by typing one or more keywords in the window for entering the concept-structured layout at a location where the image concept of the keyword is sought.

8. The method of claim 7 further comprising associating ellipses with each of the keywords to specify the scope and location of the concept associated with the keyword in an image.

9. The method of claim 8 wherein the user can edit the direction and size of the ellipses to alter the scope and location of the concept associated with the keyword in an image.

10. The method of claim 6, further comprising using the synthesized image to find an image similar to the concept-structured layout in a new set of images.

11. The method of claim 6 further comprising the user manually
    selecting an image to replace a representative image in the synthesized image.

12. The method of claim 6 further comprising a user moving a representative image in the synthesized image to a new location in the window by dragging the representative image with the input device.

13. A method for synthesizing a new image, comprising:
    displaying on a display a window for entering a concept-structured query in the form of a concept-structured layout of an image to be synthesized from a set of images;
    receiving a concept-structured layout via a window by placing one or more image concepts in locations on the window using a user interface data entry device;
    using the input concept-structured layout to find a group of representative images in the image set for each concept in each location in the window;
    determining the best representative image from each group of representative images;
    finding the image center for each best representative image;
    aligning each located image center with the location of a corresponding concept in the window; and
    seamlessly stitching the aligned best representative images to output a synthesized image on the display.

14. The method of claim 13 wherein a user inputs the concept structured query by typing keywords in the window for entering the concept-structured layout at each location of each placed image concept.

15. The method of claim 14 further comprising associating ellipses with each of the keywords to specify the scope and location of the concept associated with the keyword in an image, and wherein the user can edit the direction and size of the ellipses to alter the scope and location of the concept associated with the keyword in an image.

16. The process method of claim 13 wherein the output of the synthesized image on the display displays sub-regions of the best representative images separated by a contour and associated input keywords.

17. The method of claim 13 further comprising the user manually selecting an image to replace a representative image in the synthesized image.

18. The method of claim 13, further comprising:
using the synthesized image to find an image in a set of images that is similar to the concept-structured layout.

* * * * *